US011324193B2

(12) United States Patent
Tamulewicz

(10) Patent No.: US 11,324,193 B2
(45) Date of Patent: May 10, 2022

(54) SYSTEM AND METHOD FOR COUPLING RESPECTIVE HALVES OF A SMALL ANIMAL HABITAT

(71) Applicant: PetSmart Home Office, Inc., Phoenix, AZ (US)

(72) Inventor: Paul Tamulewicz, Glendale, AZ (US)

(73) Assignee: PETSMART HOME OFFICE, INC., Phoenix, AZ (US)

(*) Notice: Subject to any disclaimer, the term of this patent is extended or adjusted under 35 U.S.C. 154(b) by 288 days.

(21) Appl. No.: 16/567,857

(22) Filed: Sep. 11, 2019

(65) Prior Publication Data

US 2020/0100454 A1 Apr. 2, 2020

Related U.S. Application Data

(60) Provisional application No. 62/737,583, filed on Sep. 27, 2018.

(51) Int. Cl.
*A01K 1/03* (2006.01)
*F16B 2/22* (2006.01)

(52) U.S. Cl.
CPC . *A01K 1/03* (2013.01); *F16B 2/22* (2013.01)

(58) Field of Classification Search
CPC .... A01K 1/03; A01K 1/02; A01K 1/00; F16B 2/22; F16B 2/24; F16B 2/241; F16B 2/245; F16B 5/0664; F16B 2/0657; F16B 21/06; Y10T 24/3742; A43C 5/00; A63H 1/00; A63H 11/12; A63H 17/00; A63H 7/04
USPC ................................................ 446/461–471
See application file for complete search history.

(56) References Cited

U.S. PATENT DOCUMENTS

| | | | | |
|---|---|---|---|---|
| 5,253,612 A | * | 10/1993 | Goetz | A01K 1/0245 119/496 |
| 5,694,886 A | * | 12/1997 | Hauck | A01K 1/033 119/412 |
| 5,722,348 A | * | 3/1998 | Phillips | A01K 1/03 119/421 |

(Continued)

FOREIGN PATENT DOCUMENTS

| CN | 204762697 U | 11/2015 |
|---|---|---|
| CN | 206961034 U | 2/2018 |

OTHER PUBLICATIONS https://uedata.amazon.com/Fillable-Transparent-Container-Volkswagen-Yolli/dp/B00HPXBNMY (Year: 2014).*

*Primary Examiner* — Timothy D Collins
*Assistant Examiner* — Maria E Graber
(74) *Attorney, Agent, or Firm* — Fox Rothschild LLP

(57) ABSTRACT

A small animal habitat in the form of, e.g., an automobile and a method for coupling respective halves of a small animal habitat. The small animal habitat includes a top shell portion, the top shell portion including a plurality of top wheel portions, each of the top wheel portions forming a top half of a respective wheel section. The habitat also includes a bottom shell portion, the bottom shell portion having a plurality of bottom wheel portions, each of the bottom wheel portions forming a bottom half of a respective wheel section. Additionally, a plurality of assembly rings are provided, wherein each assembly ring is configured to couple the top wheel portion to the bottom wheel portion of a respective wheel section so as to hold the top shell portion and the bottom shell portion of the small habitat in engagement.

8 Claims, 5 Drawing Sheets

(56) References Cited

U.S. PATENT DOCUMENTS

| | | | | |
|---|---|---|---|---|
| 6,006,406 A | * | 12/1999 | Chung | A41H 37/02 24/114.12 |
| 6,062,171 A | * | 5/2000 | Tominaga | A01K 1/03 119/455 |
| 10,357,084 B2 | * | 7/2019 | Yu | C08L 23/06 |

* cited by examiner

SYSTEM AND METHOD FOR COUPLING RESPECTIVE HALVES OF A SMALL ANIMAL HABITAT

RELATED APPLICATIONS AND CLAIM OF PRIORITY

This patent document claims priority to U.S. Provisional Patent Application No. 62/737,583, filed Sep. 27, 2018, the disclosure of which is fully incorporated into this document by reference.

BACKGROUND

The present disclosure relates generally to small animal habitats and, more particularly, to a system and method for coupling respective halves of a small animal habitat.

Small animal habitats for housing pets such as, e.g., hamsters, gerbils, mice, rats, etc. are commonly found in many settings, and in an array of sizes and configurations. Generally, these habitats include multiple wall portions, a base portion, and a top shell portion, with at least one of the wall portions having a wire cage and/or one or more viewing windows to allow for visibility, airflow, etc. into the interior of the habitat. In some configurations, the top shell portion may form (or include) a lid, thereby allowing the pet owner to access the interior of habitat for cleaning, feeding, pet removal or replacement, etc. In other configurations, at least one of the top shell portion and the wall portions may have a door or hatch formed therein so as to allow owner access to the interior of the habitat.

Often, small animal habitats are relatively simple in shape and design, with cage-like configurations as described above. To many owners, habitats with unique themes and/or shapes may be desirable, further adding to their enjoyment of owning a pet. However, because at least a portion of the habitat must be separable from other portions so as to allow the pet owner to access the interior, as well as to ease manufacture, habitat designs having anything other than the typical cage-like configurations have been very limited.

Accordingly, this patent document described devices that are intended to address the issues discussed above and/or other issues.

SUMMARY

In accordance with one aspect of the disclosure, a small animal habitat in the form of an automobile is disclosed. The small animal habitat may include a top shell portion, the top shell portion comprising a plurality of top wheel portions, each of the top wheel portions forming a top half of a respective wheel section. The small animal habitat may also include a bottom shell portion, the bottom shell portion comprising a plurality of bottom wheel portions, each of the bottom wheel portions forming a bottom half of a respective wheel section. Additionally, the small animal habitat may include a plurality of assembly rings, wherein each assembly ring is configured to couple the top wheel portion to the bottom wheel portion of a respective wheel section so as to hold the top shell portion and the bottom shell portion of the small habitat in engagement.

According to another aspect of the disclosure, a small animal habitat is disclosed. The small animal habitat may include a top shell portion, the top shell portion having a plurality of slots formed therein. The habitat may further include a bottom shell portion, the bottom shell portion having a plurality of slots formed therein, wherein the bottom shell portion is entirely separable from the top shell portion. Additionally, the habitat may include a plurality of assembly rings, wherein each assembly ring comprises at least a first clip and at least a second clip, and further wherein the first clip of a respective one of the plurality of assembly rings is configured to mate with a respective one of the plurality of slots formed in the top shell portion, and the second clip of the respective one of the plurality of assembly rings is configured to mate with a respective one of the plurality of slots formed in the bottom shell portion so as to hold the top shell portion and bottom shell portion in engagement.

In accordance with another aspect of the disclosure, a method of coupling respective halves of a small animal habitat is disclosed. The method may include providing a top shell portion having a plurality of slots formed therein, and providing a bottom shell portion having a plurality of slots formed therein. The method may also include positioning the top shell portion and the bottom shell portion together in alignment. Furthermore, the method may include providing a plurality of assembly rings, wherein each assembly ring comprises at least a first clip and at least a second clip. The method may include mating the first clip of a respective one of the plurality of assembly rings with a respective one of the plurality of slots formed in the top shell portion. Also, the method may include mating the second clip of the respective one of the plurality of assembly rings with a respective one of the plurality of slots formed in the bottom shell portion so as to hold the top shell portion and bottom shell portion in engagement.

DETAILED DESCRIPTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "side", "top", and "bottom" are not intended to limit the invention to a particular direction or orientation, but instead are only intended to denote relative positions, or positions corresponding to directions shown when a small animal habitat is oriented as shown in the Figures.

Figure 1:
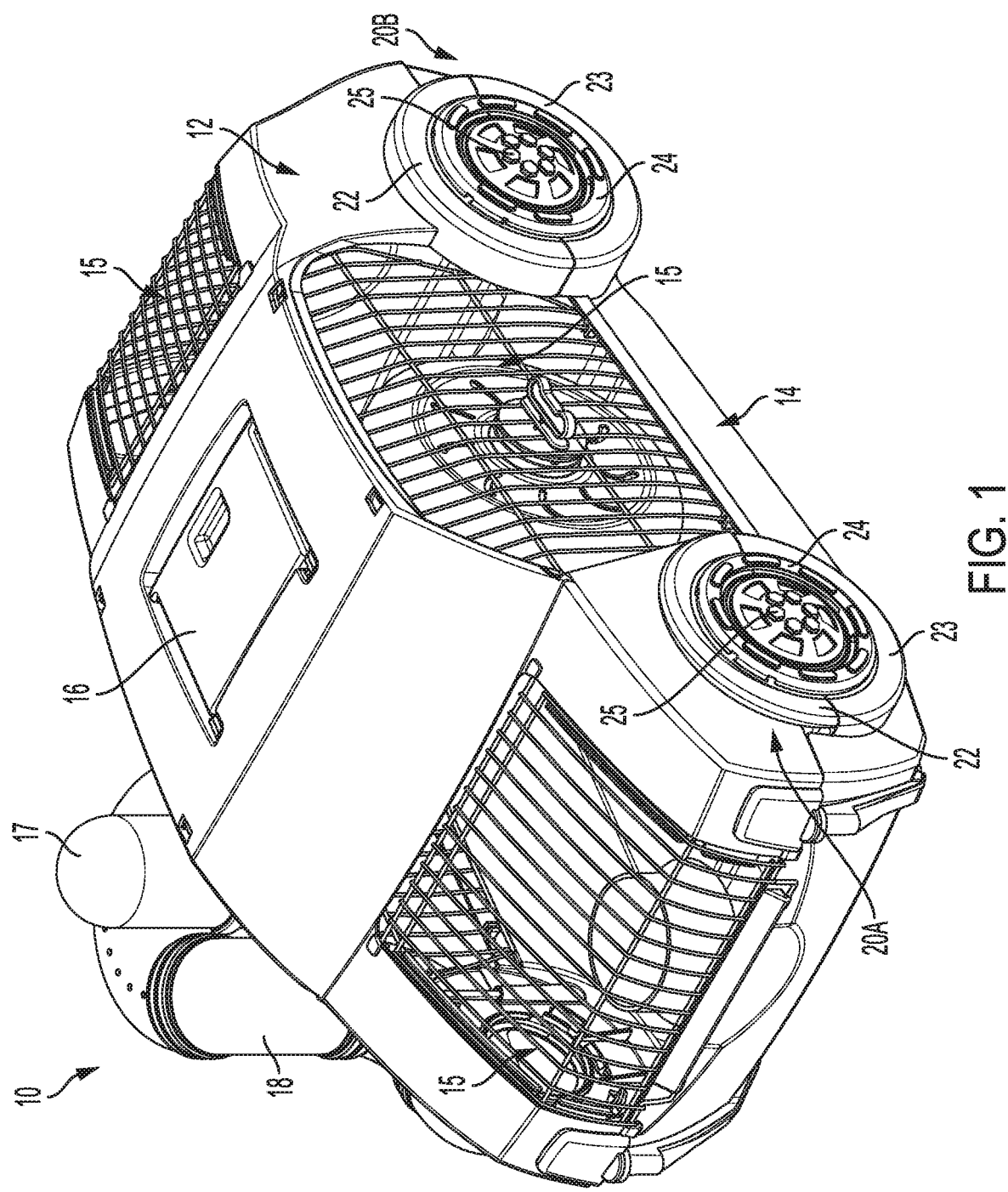
FIG. 1 is a perspective view of a small animal habitat in accordance with an aspect of the disclosure.
Figure 2:
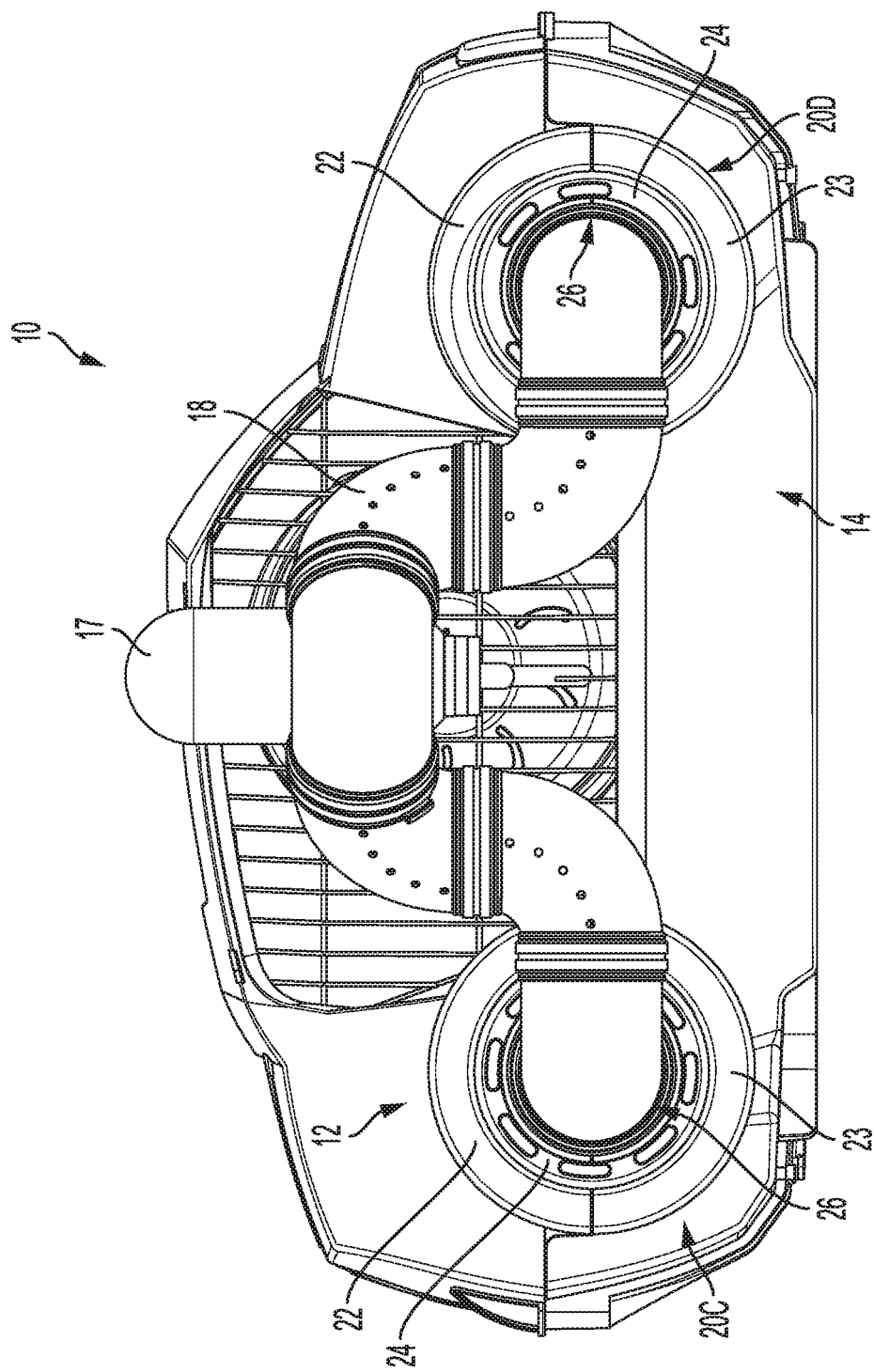
FIG. 2 is a side plan view of the small animal habitat of FIG. 1.

Referring to FIGS. 1-2, a small animal habitat 10 in accordance with an aspect of the disclosure is shown. Small animal habitat 10 may be configured to hold any appropriate type of small animal, such as, e.g., one or more hamsters, gerbils, mice, rats, etc. As illustrated, small animal habitat 10 is formed in the shape of an automobile (i.e., a car), providing for a more unique and aesthetically appealing structure as compared to conventional cubic and/or cage-like small animal habitats. Small animal habitat 10 may include a top shell portion 12 and a separate bottom shell portion 14. As will be described below, top shell portion 12 may be selectively removable from bottom shell portion 14 so as to allow for access into the interior of the small animal habitat 10 for animal removal, cleaning, etc. Each of the top shell portion 12 and bottom shell portion 14 may be formed of any appropriate material such as, e.g., plastic, polymers, metal, etc. Furthermore, one or both of top shell portion 12 and bottom shell portion 14 may be formed so as to be opaque, clear, transparent, or translucent. Additionally, small animal habitat 10 may include a plurality of wire-formed cage portions 15, which allow for visibility and/or airflow into the interior of the small animal habitat 10. Furthermore, one or more of the cage portions 15 may include hinges so as to form one or more selectively-openable doors, thereby allowing one or more of the cage portions 15 to pivot relative to the top shell portion 12 and/or the bottom shell portion 14 to enable user access to the interior of the small animal habitat 10. The cage portions 15 may be formed of a plurality of closely-spaced wires, thereby preventing the small animal housed therein from escaping. Alternatively, one or more of the cage portions 15 may be formed of a material other than wires, such as, e.g., clear or translucent plastic, etc. In some embodiments, the cage portions 15 are coupled only to the top shell portion 12. Thus, when top shell portion 12 is removed from bottom shell portion 14, the cage portions 15 are also removed. However, it is to be understood that cage portions 15 could alternatively be coupled only to the bottom shell portion 14 or to each of top shell portion 12 and bottom shell portion 14. A pivotable hatch 16 may also be provided in the top shell portion 12, which may allow the user to quickly access at least a portion of the interior of the small animal habitat 10.

Referring still to FIGS. 1-2, small animal habitat 10 may further include exterior accessories such as a mounted water bottle 17 and/or one or more tubes 18. As shown in FIG. 2, the one or more tubes 18 may provide a passage outside of the interior space of the small animal habitat 10 through which the small animal may travel. The small animal habitat 10 may include a plurality of wheel sections 20A, 20B, 20C, 20D, with the one or more tubes 18 having one or more interfaces 26 capable of coupling the tube(s) 18 to one or more wheel sections 20A, 20B, 20C, 20D. Each wheel section 20A, 20B, 20C, 20D aesthetically mimics the wheels/tires of an automobile. However, each wheel section 20A, 20B, 20C, 20D is further configured to provide an interface for secure attachment between the respective top shell portion 12 and the bottom shell portion 14, as well as for the tube(s) 18, as will be set forth in further detail below. In the example shown in FIGS. 1-2, the tube 18 is coupled at a first end to a wheel section 20C and at a second end to a wheel section 20D, thereby allowing the small animal to travel between each respective wheel section outside of the conventional bounds of the small animal habitat 10. Furthermore, it is to be understood that the one or more tubes 18 may extend to other wheel sections and/or may extend to habitats or accessories not associated with small animal habitat 10.

The wheel sections 20A, 20B, 20C, 20D shown in FIGS. 1-2 each include a top wheel portion 22 and a bottom wheel portion 23. Each top wheel portion 22 is formed as part of the top shell portion 12 of the small animal habitat 10, while each bottom wheel portion 23 is formed as part of the bottom shell portion 14. Thus, top wheel portion 22 is separated from bottom wheel portion 23 when top shell portion 12 is likewise separated from bottom shell portion 14. However, as will be set forth in further detail below, each wheel section 20A, 20B, 20C, 20D also includes a unitary assembly ring 24. Each assembly ring 24 is configured to couple a respective top shell portion 12 and bottom shell portion 14 together, while also providing for additional decorative embellishments to the small animal habitat 10, adding a rim-like feature to each wheel section 20A, 20B, 20C, 20D.

Additionally and/or alternatively, each wheel section 20A, 20B, 20C, 20D that is not coupled to one or more tubes 18 may include a selectively-removable cap 25, which may close the circular opening formed between respective top wheel portion 22 and bottom wheel portion 23. In this way, each cap 25 may prevent the small animal from escaping, while also producing a hubcap-like decorative appearance to the wheel sections of the small animal habitat 10. As the user is capable of selectively removing each cap 25, one or more tubes 18 may be coupled to any or all of the wheel sections 20A, 20B, 20C, 20D, thereby enabling numerous different configurations and attachment/accessory options. Both the assembly ring 24 and the cap 25 may be formed of any appropriate material such as, e.g., plastic.

Figure 3:
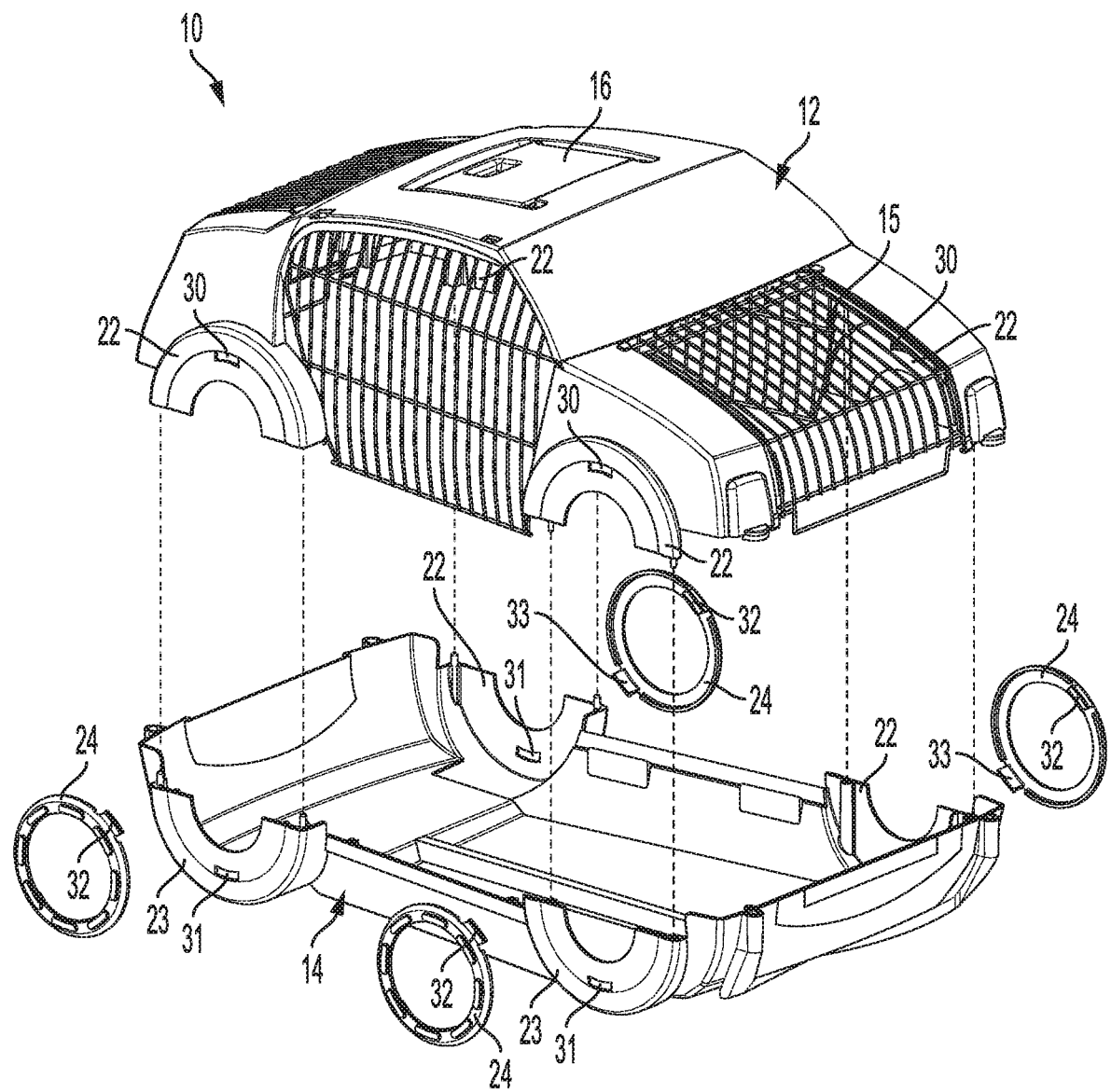
FIG. 3 is a partially exploded view of the small animal habitat of FIG. 1.

Referring now to FIG. 3, a partially exploded view of the small animal habitat 10 in accordance with an aspect of the disclosure is illustrated. As discussed above, the top wheel portion 22 of each wheel section is separable from the bottom wheel portion 23, concurrent with separation of the top shell portion 12 from bottom shell portion 14. Each top wheel portion 22 includes a top slot 30 formed therein, while each bottom wheel portion 23 includes a bottom slot 31 formed therein. Relatedly, each assembly ring 24 includes a top clip 32 and a bottom clip 33 extending from respective top and bottom regions thereof. As will be described further below with respect to FIGS. 4A-5B, the connection interface created by each top slot 30 with respective top clip 32 and bottom slot 31 with respective bottom clip 33 enables the assembly rings 24 to securely hold the top shell portion 12 and bottom shell portion 14 together, without the need for additional and unsightly fasteners such as latches, screws, etc.

Figure 4B:
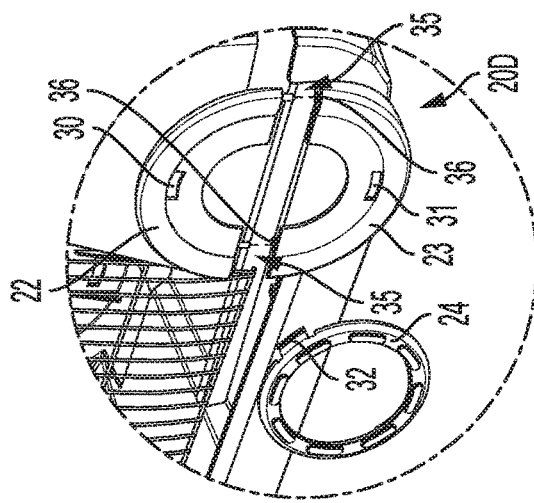
FIG. 4B is a detail view of a coupling interface between respective halves of the small animal habitat of FIG. 4A.
Figure 4A:
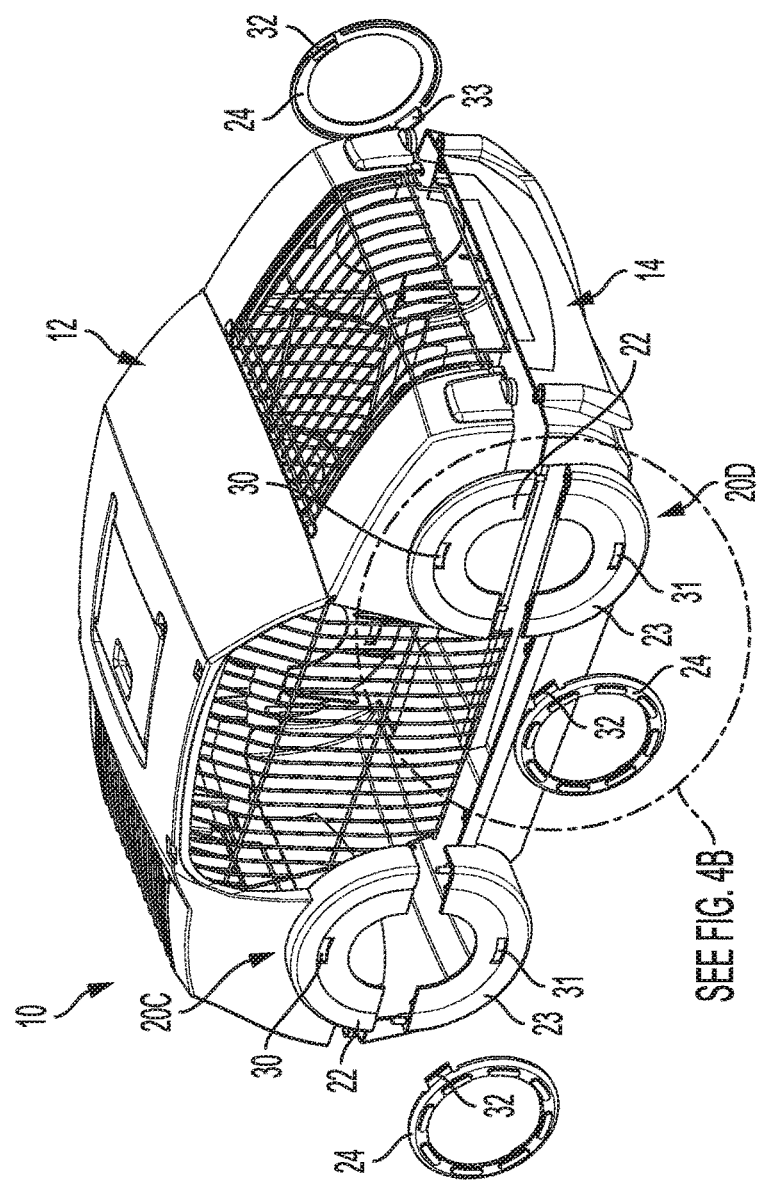
FIG. 4A is another partially exploded view of the small animal habitat of FIG. 1.

As shown in FIGS. 4A-4B, in accordance with another aspect of the disclosure, the top wheel portions 22 and bottom wheel portions 23 of each wheel section 20A, 20B, 20C, 20D may be accurately aligned through the use of pins and receiving bosses. Specifically, referring to the detail view of FIG. 4B, each top wheel portion 22 may have a pair of pins 35 extending downward from a bottom surface thereof, while each bottom wheel portion 23 may have a pair of complimentary receiving bosses 36 formed on a top surface thereof. Thus, as the top shell portion 12 and bottom shell portion 14 are pressed together, the pins 35 mate with a respective receiving boss 36, thereby holding the top wheel portions 22 and bottom wheel portions 23 of each wheel section 20A, 20B, 20C, 20D in both longitudinal and lateral alignment. While two pins 35 and two receiving bosses 36 are shown with each wheel section, it is to be understood that more or fewer pins and/or bosses may be utilized. Furthermore, in some embodiments, fewer than all wheel sections 20A, 20B, 20C, 20D may include the pins and/or receiving bosses. Additionally and/or alternatively, in some embodiments, the pins 35 may extend from the bottom wheel portions 23, while the top wheel portions 22 may include the receiving bosses 36 formed therein.

Figure 5B:
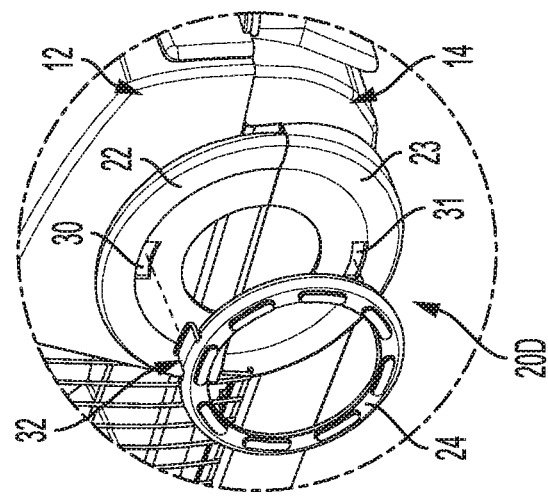
FIG. 5B is a detail view of a coupling interface of a coupling interface between respective halves of the small animal habitat of FIG. 5A.
Figure 5A:
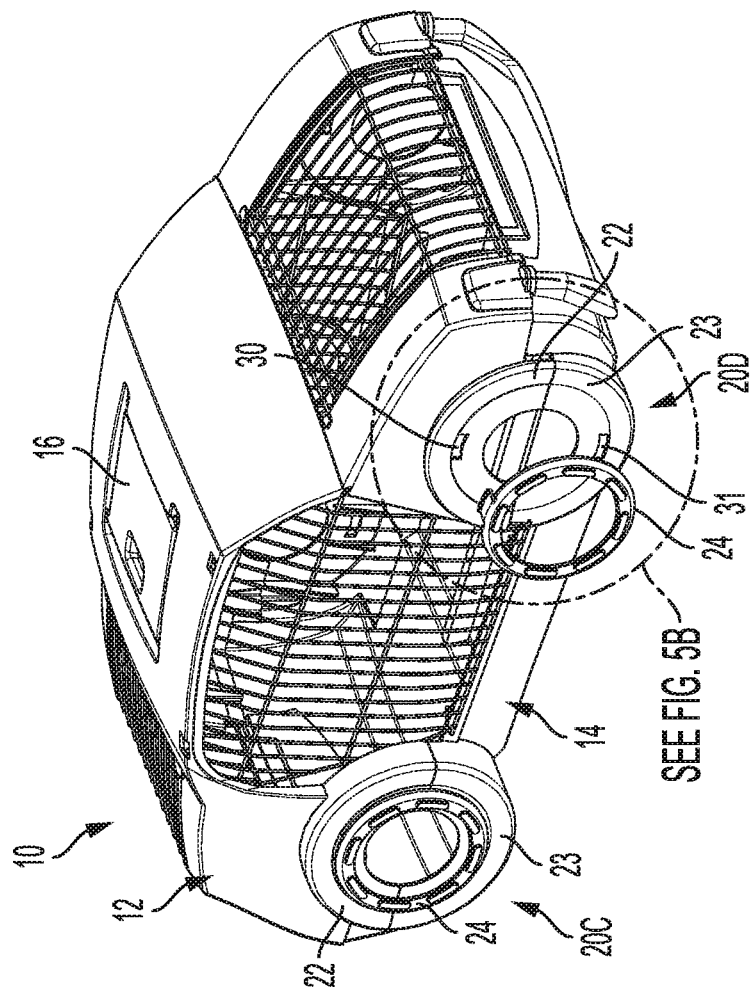
FIG. 5A is another partially exploded view of the small animal habitat of FIG. 1.

Next, referring to FIGS. 5A-5B, a detailed view of the coupling interface between each assembly ring 24 and the respective top wheel portions 22 and bottom wheel portions 23 is shown. As shown in FIG. 5B, the top clip 32 of the assembly ring 24 is sized and configured to mate with the top slot 30 of top wheel portion 22, while the bottom clip (not shown in FIG. 5B) is configured to mate with the bottom slot 31 of bottom wheel portion 23. Each of the top clip 32 and bottom clip 33 of the assembly rings 24 may be formed so as to deflect upon insertion into the top slot 30 and bottom slot 31, respectively, thereby forming a locking attachment between each assembly ring 24, top wheel portion 22, and bottom wheel portion 23. In this way, when all four assembly rings 24 are coupled to respective wheel sections 20A, 20B, 20C, 20D, the top shell portion 12 and bottom shell portion 14 of small animal habitat 10 are effectively held together, unifying the respective portions and preventing unwanted separation of the top shell portion 12 and bottom shell portion 14.

Additionally and/or alternatively, it is to be understood that the assembly rings 24 may be configured to allow for tooled or tool-less removal by the user, which would enable the user to selectively separate (and then reattach) the top shell portion 12 and bottom shell portion 14 for, e.g., animal removal, cleaning, etc. Furthermore, it is to be understood that that interface between each assembly ring 24, top wheel portion 22, and bottom wheel portion 23 may be configured utilizing features other than the clips and slots shown and described with respect to FIGS. 3-5B. For example, the interface may be configured as e.g., a quarter turn, twist-to-lock-type attachment, a threaded attachment, etc. Additionally, while the examples provided herein show and describe the use of four assembly rings 24, it is to be understood that fewer than all assembly rings 24 may be configured to hold the respective top and bottom shell portions of the small animal habitat together. For example, only two assembly rings 24 (one on each lateral side of the small animal habitat 10) may be used, while still effectively holding the top shell portion 12 and bottom shell portion 14 together.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A small animal habitat comprising:
   a top shell portion, the top shell portion having a plurality of slots formed therein, the top shell portion comprising a plurality of top wheel portions, each of the top wheel portions forming a top half of a respective wheel section, each of the top wheel portions having the plurality of slots of the top shell portion formed therein;
   a bottom shell portion, the bottom shell portion having a plurality of slots formed therein, the bottom shell portion comprising a plurality of bottom wheel portions, each of the bottom wheel portions forming a bottom half of a respective one of the wheel sections, each of the bottom wheel portions having the plurality of slots of the bottom shell portion formed therein, wherein the bottom shell portion is entirely separable from the top shell portion;
   a plurality of assembly rings configured to be separable from the top shell portion and bottom shell portion, wherein each assembly ring comprises at least a first clip and at least a second clip, and further wherein the first clip of a respective one of the plurality of assembly rings is configured to mate with a respective one of the plurality of slots formed in the top shell portion, and the second clip of the respective one of the plurality of assembly rings is configured to mate with a respective one of the plurality of slots formed in the bottom shell portion so as to hold the top shell portion and bottom shell portion in engagement;
   at least two pins extending from a bottom surface of each top wheel portion; and
   at least two receiving bosses formed within a top surface of each bottom wheel portion, wherein each of the pins is configured to be received within a respective one of the bosses so that the engagement of the pins and the respective bosses holds the top wheel portions and the bottom wheel portions of each of the wheel sections in longitudinal and lateral alignment.

2. The small animal habitat of claim 1, wherein the small animal habitat comprises four wheel sections.

3. The small animal habitat of claim 1, wherein each of the plurality of assembly rings is formed of a plastic material.

4. The small animal habitat of claim 1, further comprising a plurality of wire-formed cage portions.

5. The small animal habitat of claim 4, wherein the plurality of wire-formed cage portions are integrated into to the top shell portion.

6. The small animal habitat of claim 5, wherein one or more of the wire-formed cage portions is configured to pivot open to allow access into the interior of small animal habitat.

7. A method of coupling respective halves of a small animal habitat, the method comprising:
   providing a top shell portion having a plurality of slots formed therein, the top shell portion comprising a plurality of top wheel portions, each of the top wheel portions forming a top half of a respective wheel section, each of the top wheel portions having the plurality of slots of the top shell portion formed therein;
   providing a bottom shell portion having a plurality of slots formed therein, the bottom shell portion comprising a plurality of bottom wheel portions, each of the bottom wheel portions forming a bottom half of a respective one of the wheel sections, each of the bottom wheel portions having the plurality of slots of the bottom shell portion formed therein, wherein the bottom shell portion is entirely separable from the top shell portion;

providing at least two pins extending from a bottom surface of each top wheel portion, and at least two receiving bosses formed within a top surface of each bottom wheel portion;

positioning the top shell portion and the bottom shell portion together in longitudinal and lateral alignment by engaging each of the pins with a respective one of the bosses;

providing a plurality of assembly rings configured to be separable from the top shell portion and bottom shell portion, wherein each assembly ring comprises at least a first clip and at least a second clip;

mating the first clip of a respective one of the plurality of assembly rings with a respective one of the plurality of slots formed in the top shell portion; and mating the second clip of the respective one of the plurality of assembly rings with a respective one of the plurality of slots formed in the bottom shell portion so as to hold the top shell portion and bottom shell portion in engagement.

8. The method of claim 7, wherein providing the plurality of assembly rings comprises providing four assembly rings.

\* \* \* \* \*